June 6, 1961 G. F. ABBOTT, JR., ET AL 2,987,628

BISTABLE TRIGGER CIRCUIT

Filed Nov. 16, 1956 2 Sheets-Sheet 1

INVENTORS: G. F. ABBOTT, JR.
E. E. SUMNER

BY Harold C. Herman
ATTORNEY

June 6, 1961 G. F. ABBOTT, JR., ET AL 2,987,628

BISTABLE TRIGGER CIRCUIT

Filed Nov. 16, 1956 2 Sheets-Sheet 2

INVENTORS: G. F. ABBOTT, JR.
E. E. SUMNER

BY Harold C. Herman
ATTORNEY

United States Patent Office 2,987,628

Patented June 6, 1961

2,987,628

BISTABLE TRIGGER CIRCUIT

George F. Abbott, Jr., New York, N.Y., and Eric E. Sumner, North Caldwell, N.J., assignors to Bell Telephone Laboratories, Incorporated, New York, N.Y., a corporation of New York Filed Nov. 16, 1956, Ser. No. 622,646

6 Claims. (Cl. 307—88.5)

This invention relates to trigger circuits and more particularly to bistable transistor trigger circuits.

A bistable trigger circuit is one which has two equilibrium conditions and which can be triggered or shifted from one equilibrium condition to the other. There are essentially two general types of transistors which are utilized in trigger circuits: point contact transistors which have a current amplification factor greater than 1; and junction tarnsistors which have a current amplification factor less than 1. Both types of tarnsistors have a base electrode, an emitter electrode and a collector electrode.

The base electrode of the point contact transistor is in large area low resistance contact with a block of semiconductive material and the emitter and collector electrodes are in rectifying contact with the block of semiconductive material. The semiconductive material may be of the N type having an excess of electrons or of the P type having an excess of "holes." Junction transistors may be of the P-N-P type or of the N-P-N type having a single crystal with one type of material in the center and the other type on both sides. The base electrode of the junction transistor is connected to the central material and the emitter and collector electrodes are connected, respectively, to the ends or side material.

Transistors which have a current amplification factor greater than 1 lend themselves to trigger circuit applications. Such circuits are described, for example, in the Patent 2,579,336 issued to A. J. Rack on December 18, 1951, and in the patent 2,831,983 issued to B. Ostendorf Jr. on April 22, 1958. When a bistable trigger circuit includes only one transistor, the current amplification factor of the transistor must be greater than 1 to allow for the bistability. Single transistor bistable trigger circuits utilize, therefore, point contact transistors. When high currents are to be handled, however, point contact transistors are not suitable because the rectifying contacts at the emitter and collector electrodes have a limiting effect on the current handling capacity of the transistor. Junction transistors can handle higher currents than point contact transistors but are not as fast.

It is the general object of this invention to provide a low cost, fast operating bistable transistor trigger circuit which has a high-current handling capacity.

Another object of this invention is to provide a bistable trigger circuit which handles high currents without excessive dissipation.

Still another object of this invention is to provide a bistable transistor trigger circuit which has a sensitivity independent of load changes.

These and other objects of the invention are attained in the illustrative embodiment of this invention in which a grounded emitter junction transistor is utilized as the switching element or buffer stage for a point contact transistor bistable stage. The base electrode of the junction transistor is directly connected to the emitter electrode of the point contact transistor. Excessive dissipation is avoided when large currents are handled because the output is supplied through the low emitter-to-collector impedance of the junction transistor and not through the point contact transistor or other relatively high impedance. Moreover, in order to restrict dissipation or power consumption, both transistors are non-conductive or turned off when an output is not required.

A feature of this invention relates to the provision of a bistable transistor circuit having a point contact transistor which provides for the bistability and rapid switching and a junction transistor which provides for the high-current handling capacity without excessive dissipation.

Another feature of this invention relates to the biasing circuit arrangement for both transistors. By connecting the buffer stage directly to the emitter electrode of the point contact transistor, a single biasing source may be utilized to reverse bias the emitter with respect to the base of both transistors and the effects of the leakage current of the point contact transistor are not cumulative. In two-stage transistor circuits, the leakage current through the first stage is amplified by the second stage unless an additional biasing potential source is provided for the second stage. In the illustrative embodiment of this invention, the additional biasing source is not required because the usual point contact biasing source functions also as the biasing source for the junction transistor buffer stage.

Still another feature of this invention relates to the provision of a buffer circuit which provides an output pulse of the same polarity as the input pulse to the bistable trigger circuit. In computer systems and the like, often only positive or only negative pulses are utilized throughout the system. It is advisable in such systems for each component, such as the bistable trigger circuit of the present invention, to provide an output pulse from the component which has the same polarity as the input pulse to the component.

A further feature of this invention pertains to the provision of a buffer circuit which attenuates input pulse leakage due to input overdrive. The overdrive appears at the emitter and collector electrodes of the point contact transistor but the connection of the buffer to the emitter electrode of the point contact transistor functions to attenuate or block leakage due to the overdrive to the load. The buffer circuit functions, in this manner, to isolate the load from the set and reset inputs. The isolation of the load results in achieving circuit sensitivity independent of load changes.

Further objects and features will become apparent upon consideration of the following description taken in conjunction with the drawing wherein.

Figure 1:
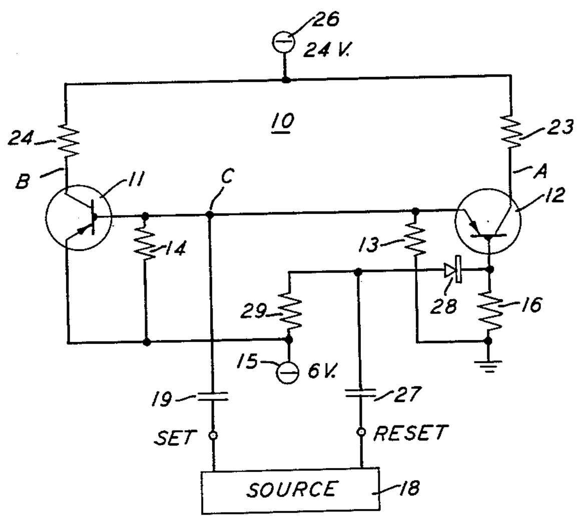
FIG. 1 is a circuit representation of the bistable transistor circuit of the present invention.

Referring to FIG. 1, the pulse amplifier 10 includes a P-N-P junction transistor 11 and an N type point contact transistor 12. The emitter electrode of transistor 12 is directly connected to the base electrode of the transistor 11. The two transistors 11 and 12 assume the same conductive condition, on or off, at any given time. With the transistors 11 and 12 nonconductive, or off, the potential at point C is determined by a voltage divider which includes the resistors 13 and 14. The serially connected resistors 13 and 14 are connected between ground and the minus 6-volt battery 15 which has its positive terminal grounded. Point C, which is the junction point between resistors 13 and 14, is also the junction point between the emitter electrode of transistor 12 and the base electrode of transistor 11.

The voltage divider, including resistors 13 and 14, function as a biasing circuit for the two transistors 11 and 12. The current from ground through resistors 13 and 14 to battery 15 serves to reverse bias the emitter electrode of transistor 12 with respect to its base electrode, and also to reverse bias the emitter electrode of transistor 11 with respect to its base electrode. The emitter electrode of transistor 12 is more negative than its base electrode, because the base electrode is at substantially ground potential due to its connection to ground through the base resistor 16. The emitter electrode of transistor 11 is negative with respect to its base electrode because the emitter electrode is directly connected to the minus 6-volt source 15 and the base electrode is at a potential between minus 6 volts and ground potential due to the effect of the current through resistors 13 and 14.

Figure 3:
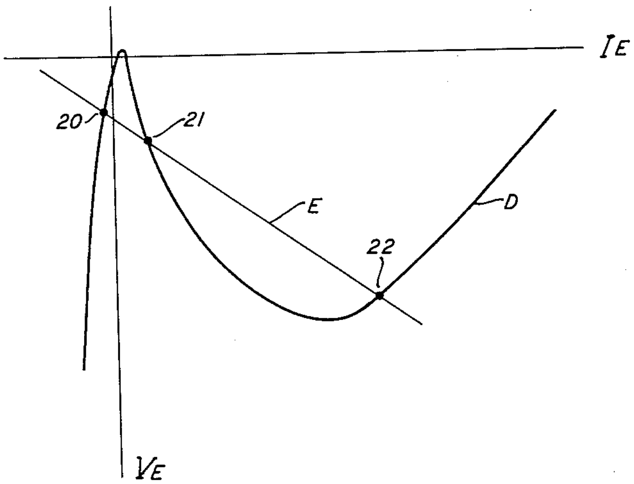
FIG. 3 is an input emitter characteristic and load line of a typical bistable stage utilized in the transistor circuit of the present invention.

The resistor 16 functions together with the point contact transistor 12 to provide for a negative resistance characteristic which is illustrated as curve D in FIG. 3. The base current of transistor 12 is the algebraic sum of its emitter and collector currents, and since the collector current is negative and larger in magnitude than the emitter current when transistor 12 is triggered, the base current is then positive. When the transistor 12 is triggered or set therefore, a positive emitter current results in a positive base current. The positive base current flows through the base resistor 16 and makes the base electrode more negative with respect to the emitter electrode. When the base electrode becomes more negative with respect to the emitter electrode, the emitter current is further increased inducing thereby an even larger positive base current. It is this regenerative feedback which gives rise to the negative resistance characteristic D shown in FIG. 3. It is the combination of the transistor 12 having a current amplification factor greater than 1, and the feedback promoting base resistor 16 which provides for this effect.

The emitter circuit of transistor 12, which includes the biasing circuit and the transistor 11, is designed to have its load line E intersect the negative resistance characteristic D in three places or points 20, 21 and 22 to provide for bistable operation. The three intersections provide for an "off" or low-current equilibrium condition at point 20, an intermediate unstable condition at point 21 and an "on" or high-current equilibrium condition at point 22. In order to trigger the point contact transistor 12 from its off to its on condition, the potential at its emitter electrode must be increased to value above ground potential, or over the knee of the negative resistance characteristic.

Figure 2:
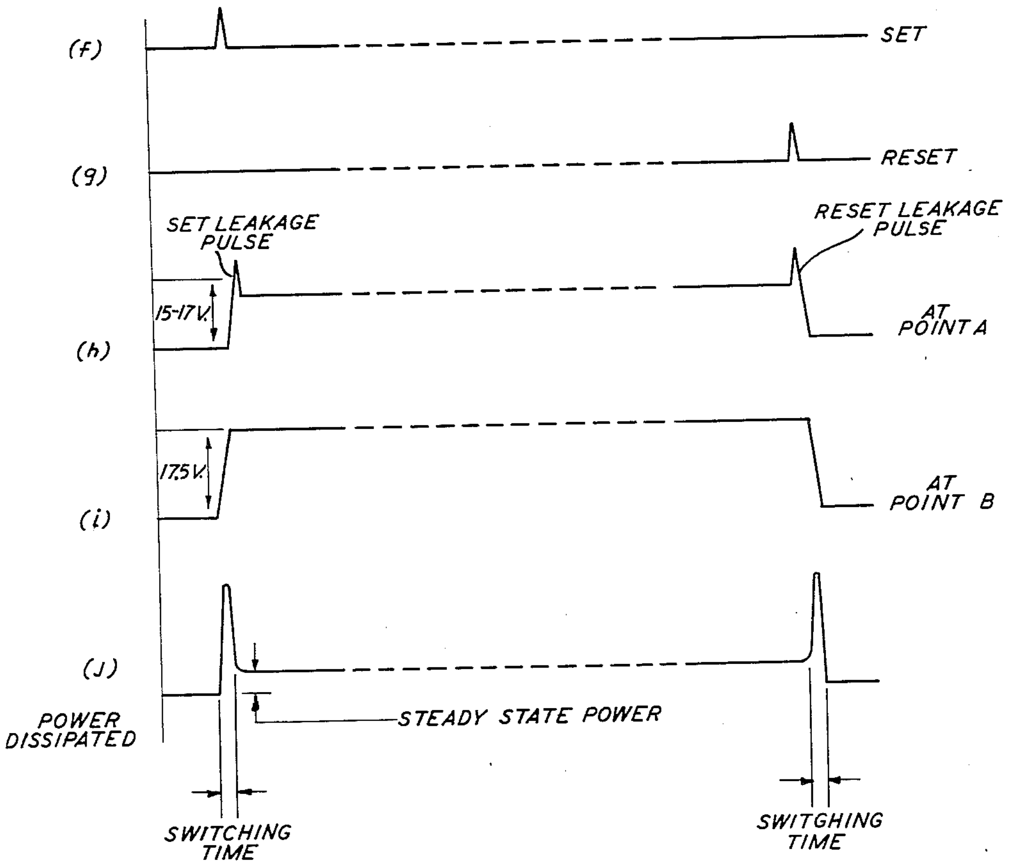
FIG. 2 is a series of curves illustrating the operation of the bistable transistor circuit shown in FIG. 1.

The increase of emitter potential is provided for by a set or turn-on pulse from the pulse source 18 through the coupling capacitor 19. The set pulse is illustrated in FIG. 2, curve *f*. When the potential increases at the emitter electrode of transistor 12, its emitter-to-base junction becomes first relatively less reverse biased and then forward biased. When the junction becomes forward biased, a leakage pulse, shown in FIG. 2, curve *h* appears at the collector electrode of transistor 12 and resistor 23 connected thereto. The leakage pulse occurs because the input or turn-on pulse overdrives the emitter electrode of transistor 12. It is substantially impossible to provide a turn-on pulse which has an amplitude exactly equal to the necessary minimum for turning on the transistor. Moreover, the rise time or reaction time of transistor 12 is considerably improved if it is driven to its high-current equilibrium condition by a large input pulse. The rise of the collector current in a point contact transistor is the result of the presence of minority carriers (holes injected at the emitter for N-type transistor) in the immediate neighborhood of the collector. The minority carriers take a finite length of time to travel from the emitter to the collector, and account for a time delay of the output pulse with respect to the input pulse. The reason for this delay is that all minority carriers do not take the same path in traveling from the emitter to the collector. They do not take the same path because of the geometry of the transistor and the collisions the minority carriers suffer in traveling through the crystal. The minority carriers injected into the emitter at the initiation of the input pulse do not therefore arrive at the collector at the same time. This time spread or delay accounts for the rise time or delay of the output pulse with respect to the input pulse. In order to provide a minimum rise time, therefore, the input pulse overdrives the emitter-to-base junction of transistor 12.

As shown in FIG. 2, curve *i*, the overdrive leakage is not transmitted through the junction transistor 11 to the load resistor 24 which is connected to the collector electrode of transistor 11. The resistors 24 and 23 are both also connected to the minus 24-volt potential source 26 which has its positive terminal grounded. The overdrive does not result in a leakage pulse to the load resistor 24 because the increase in potential at the base electrode of transistor 11 tends to further reverse bias the emitter-to-base junction of transistor 11. Transistor 11 is turned on only after transistor 12 enters the negative resistance region of its characteristic and the potential of the base electrode of transistor 11 falls below that of its emitter electrode, which is at minus 6 volts. The overdrive results, therefore, in a leakage pulse at point A in FIG. 1 as depicted in FIG. 2, curve *h*, but not at point B in FIG. 1 as shown in FIG. 2, curve *i*.

When transistor 11 turns on, it supplies the load current through resistor 24 through its low impedance emitter-to-collector path. Excessive dissipation is avoided in this manner since none of the load current is through the point contact transistor or the higher impedance base-to-collector path of the junction transistor. As shown in FIG. 2, curve *j*, the power dissipation of transistor 11 is very low when transistor 11 is on. The voltage drop across the emitter-to-collector junction is only approximately .5 volt when 100 milliamperes are provided through the load resistor 24 so that the dissipation is 50 milliwatts.

When transistor 12 is turned on, it presents a very low impedance in the base emitter circuit of transistor 11. The high speed bistable stage including transistor 12 functions, therefore, to drive the buffer stage including transistor 11. The point contact transistor 12 is utilized in the driving or bistable stage first because the transistor must have a current amplification factor greater than one and secondly because point contact transistors are faster than junction transistors. By rapidly reducing the impedance connected to the base electrode of transistor 11, transistor 11 is overdriven or rapidly triggered.

The pulse provided to the load resistor 24 is positive or of the same polarity as the input pulse from the source 18. When transistor 11 is triggered, the potential at its collector electrode, or point B, changes from minus 24 volts to minus 5.5 volts. The pulse which appears at point C is of the opposite polarity because the potential decreases to minus 6 volts when the transistors 11 and 12 are triggered. By connecting the buffer stage to the emitter electrode of transistor 12, the phase reversal provided by transistor 11 results in an output pulse of the same polarity as the input or set pulse from source 18.

Once the pulse amplifier 10 is turned on, it remains turned on until a positive reset pulse is provided from source 18 through the capacitor 27 and varistor 28 to the base electrode of transistor 12. The varistor 28 is normally reversed biased due to its connection through resistor 29 to the minue 6-volt source 15. The positive reset pulse, depicted in FIG. 2, curve *g*, is of sufficient magnitude to overcome the reverse biasing of varistor 28 and to reverse bias the emitter electrode relative to the base electrode of transistor 12.

Referring to FIG. 3, the potential at point C must be relatively reduced from that equivalent to point 22 to below the knee of curve D.

Just as the overdriving set pulse caused a leakage pulse at point A in FIG. 1, the overdriving reset pulse also causes a leakage pulse at point A as shown in FIG. 2, curve *h*. The leakage pulse results at point A because the reset pulse tends to increase the bias between the collector and base electrodes of transistor 12. As the emitter current of transistor 12 decreases from that corresponding to point 22 in FIG. 3, the emitter voltage first increases or becomes larger in magnitude.

When transistor 12 turns off, it increases the impedance in the base path of transistor 11 to cause it to turn off. Transistor 11 turns off because the potential at its base electrode increases from minus 6 volts when transistor 12 becomes non-conductive. When the potential at the base electrode of transistor 11 increases, the emitter electrode becomes reverse biased with respect to the base electrode and transistor 11 turns off.

In an illustrative embodiment of this invention the circuit parameters are as follows:

| | |
|---|---|
| Resistor **13** | 15,000 ohms |
| Resistor **14** | 3,000 ohms |
| Battery **15** | Minus 6 volts |
| Resistor **16** | 1,800 ohms |
| Capacitor **19** | 1,500 micro-microfarads |
| Resistor **23** | 1,620 ohms |
| Resistor **24** | 500 ohms |
| Battery **26** | Minus 24 volts |
| Capacitor **27** | .05 microfarad |
| Resistor **29** | 10,000 ohms |

It is to be understood that the above-described arrangement is illustrative of the application of the principles of this invention. Numerous other arrangements may be devised. For example, the magnitude of the current and potential conditions may be varied. It is evident, therefore, that other arrangements may be devised by those skilled in the art without departing from the spirit and scope of the invention.

What is claimed is:

1. A trigger circuit for switching substantial currents without excessive dissipation comprising a current multiplication transistor having a base electrode, a semiconductor body in contact with said base electrode and emitter and collector electrodes in contact with said body, means connected to said collector electrode for supplying an operational potential, a feedback promoting impedance connected to said base electrode, an emitter circuit connected to said emitter electrode and providing with said feedback impedance for a first low current equilibrium condition and a second high current equilibrium condition, said emitter circuit including an emitter buffer stage and a common biasing circuit, said emitter buffer stage including a junction transistor having a semiconductor body and base, emitter and collector electrodes connected to said body, said base electrode of said junction transistor being directly connected to said emitter electrode of said current multiplication transistor, said biasing circuit including a single potential source and means operative to reverse bias said emitter electrode of said current multiplication transistor with respect to said base electrode of said current multiplication transistor and also to reverse bias said emitter electrode of said junction transistor with respect to said base electrode of said junction transistor, means connected to said emitter electrode of said current multiplication transistor for applying a turn-on pulse to trigger said current multiplication transistor from said first equilibrium condition to said second equilibrium condition, means connected to said base electrode of said current multiplication transistor for applying a turn-off pulse to trigger said current multiplication transistor from said second equilibrium condition to said first equilibrium condition, a load device, and means connecting said load device to said collector electrode of said junction transistor.

2. A bistable trigger circuit comprising a point contact transistor having a semiconductor body and emitter, base and collector electrodes connected to said body, a feedback promoting impedance connected to said base electrode to provide with said point contact transistor for a negative resistance characteristic, means connected to said collector electrode for supplying an operational potential thereto, means connected to said point contact transistor for applying triggering pulses thereto, a load device, circuit means connecting said emitter electrode to said load device including a junction transistor, said junction transistor having a semiconductor body and an emitter, base and collector electrode in contact with said body, said base electrode of said junction transistor being directly connected to said emitter electrode of said point contact transistor, means connecting said load device to said collector electrode of said junction transistor, and a common biasing circuit having a single potential source for both said junction and said point contact transistors, said biasing circuit being connected to said emitter and said base electrodes of said junction and said point contact transistors.

3. A transistor circuit comprising a bistable stage having a first transistor, said first transistor including base, collector and emitter electrodes, means for supplying an operational voltage to said collector electrode, means including a feedback promoting resistor connected to said base electrode for providing said first transistor a low current and a high current stable state of operation, means for transferring said first transistor between said stable states of operation, a buffer stage having a second transistor including base, collector and emitter electrodes, said emitter electrode of said first transistor being directly connected to said base electrode of said second transistor, a common biasing circuit for said bistable and said buffer stages including a source of voltage, a first impedance connected to said base and said emitter electrodes of said first transistor, and a second impedance connected between said base and said emitter electrodes of said second transistor, said first and second impedances being serially arranged with respect to said source of voltage, a load device, and means connecting said load device to said collector electrode of said second transistor.

4. A trigger circuit comprising a point contact transistor having a base, emitter and collector electrode, means connected to said collector electrode to supply an operational potential thereto, means including a feedback promoting impedance element connected to said base electrode to provide said point contact transistor with a low-current and a high-current stable state of operation, a junction transistor having an emitter-collector circuit and a base electrode, conductive means directly connecting said emitter electrode of said point contact transistor to said base electrode of said junction transistor, biasing means connected to said conductive means for normally maintaining said point contact transistor in said low-current stable state and for restricting the current through said emitter-collector circuit of said junction transistor, input signal means connected to said conductive means for supplying an input pulse of such polarity as to further restrict current through said emitter-collector circuit of said junction transistor and as to change the state of said point contact transistor to said high current stable state of operation, said biasing means including a first impedance element connected to said conductive means, means including said first impedance element effective after the termination of said input pulse and when said point contact transistor is in said high-current stable state of operation for changing the condition of said junction transistor so that load current passes through said emitter-collector circuit, and a load device connected to said emitter-collector circuit.

5. A trigger circuit comprising a point contact transistor having a base, emitter and collector electrode, means connected to said collector electrode to supply an operational potential thereto, means including a feedback promoting impedance connected to said base electrode for providing said point contact transistor a low current and a high current stable state of operation, means for transferring said point contact transistor between said stable states of operation, circuit means connected to said emitter electrode including an emitter current path, a junction transistor having a base electrode and an emitter-collector circuit, said base electrode of said junction transistor being an input electrode, a load device connected to said emitter-collector circuit of said junction transistor, and an impedance element arranged in said current path and connected to said base electrode of said junction transistor to provide biasing potentials thereto in response to current flow in said current path.

6. A bistable trigger circuit comprising a point contact transistor having a semiconductor body and emitter, base and collector electrodes connected to said body, a common junction point, a feedback promoting impedance connected between said base electrode and said common junction point, means for supplying an operation potential to said collector electrode, a source of triggering pulses connected to said emitter electrode, an emitter circuit connected to said emitter electrode to provide with said feedback promoting impedance for a negative resistance characteristic for said point contact transistor, said emitter circuit including a biasing circuit and a junction transistor, said junction transistor having a semiconductor body and emitter, base and collector electrodes in contact with said body, said base electrode of said junction transistor being directly connected to said emitter electrode of said point contact transistor, said biasing circuit having a source of biasing voltage connected to said emitter electrode of said junction transistor and a voltage divider including two serially arranged impedance elements connected between said source and said common junction point, means connecting the junction of said serially arranged impedance elements to said base electrode of said junction transistor, and a load device connected to said collector electrode of said junction transistor.

References Cited in the file of this patent

UNITED STATES PATENTS

| | | |
|---|---|---|
| 2,663,800 | Herzog | Dec. 22, 1953 |
| 2,730,576 | Caruthers | Jan. 10, 1956 |
| 2,761,965 | Dickinson | Sept. 4, 1956 |
| 2,850,694 | Hamilton | Sept. 2, 1958 |
| 2,856,520 | Lin | Oct. 14, 1958 |

FOREIGN PATENTS

| | | |
|---|---|---|
| 1,114,488 | France | Dec. 19, 1955 |
| 1,122,426 | France | May 22, 1956 |